(12) United States Patent
Fritz

(10) Patent No.: US 6,224,024 B1
(45) Date of Patent: May 1, 2001

(54) PORTABLE RETENTION APPARATUS FOR CYLINDRICAL OBJECTS

(76) Inventor: Kenneth H. Fritz, 9357 Honeywood Ct., Orangevale, CA (US) 95662-5609

( * ) Notice: Subject to any disclaimer, the term of this patent is extended or adjusted under 35 U.S.C. 154(b) by 0 days.

(21) Appl. No.: 09/328,874

(22) Filed: Jun. 8, 1999

Related U.S. Application Data

(60) Provisional application No. 60/088,820, filed on Jun. 10, 1998.

(51) Int. Cl.[7] ............................................. F16L 3/16
(52) U.S. Cl. ................................. 248/55; 248/49
(58) Field of Search ...................... 248/49, 55, 346.01, 248/105; 410/49

(56) References Cited

U.S. PATENT DOCUMENTS

| | | | |
|---|---|---|---|
| 1,646,423 | * 10/1927 | Schaub | 248/49 |
| 1,921,228 | * 8/1933 | Hetherington | 248/49 |
| 4,060,174 | 11/1977 | Gerhard | 220/23.4 |
| 4,168,007 | 9/1979 | Rohatensky | 211/71 |
| 4,175,666 | 11/1979 | Smith | 211/71 |
| 4,842,175 | 6/1989 | Towsend | 224/275 |
| 5,025,935 | 6/1991 | Hadachek | 211/71 |
| 5,299,721 | 4/1994 | Cummings | 224/42.42 |
| 5,556,062 | * 9/1996 | Ellett et al. | 248/55 |
| 5,735,412 | 4/1998 | Sheckells | 211/59.4 |

* cited by examiner

Primary Examiner—Ramon O. Ramirez
Assistant Examiner—Gwendolyn Baxter
(74) Attorney, Agent, or Firm—Heisler & Associates

(57) ABSTRACT

A portable retention and transport apparatus for cylindrical objects is provided to resist rotation and translation of a cylindrical object while resting on a horizontal surface. The apparatus is comprised of a series of tubes connected at their first and second ends via two flexible elongate cables. The connecting cables are sufficiently short to create a span between the tubes whose length is less than the outer diameter of the cylindrical object. The span created between the tubes, in combination with the interconnecting cables, creates a receiving cradle for the cylindrical object. The tubes also include a high friction surface covering to increase frictional engagement of the tubes with both the cylindrical object and the horizontal surface upon which the tubes rest. In use, the tubes are laid on the horizontal surface such that a cylindrical object rests longitudinally upon and between two of the tubes. The span between two adjacent tubes is sufficient to capture the cylindrical object between the tubes while preventing the cylindrical object from directly touching the horizontal surface, thereby maximizing the frictional engagement of the tubes with the cylindrical object and the horizontal surface.

2 Claims, 4 Drawing Sheets

US 6,224,024 B1

PORTABLE RETENTION APPARATUS FOR CYLINDRICAL OBJECTS

CROSS REFERENCE TO RELATED APPLICATIONS

This application claims benefit under Title 35, United States Code § 119(e) of United States Provisional Application Ser. No. 60/088,820 filed on Jun. 10, 1998.

FIELD OF THE INVENTION

The present invention relates to racks used for restraining movement of cylindrical objects. More particularly, this invention relates to portable racks for resisting rotation and translation of cylindrical objects, such as scuba tanks, while the cylindrical objects rest horizontally on a horizontal surface.

BACKGROUND OF THE INVENTION

The present invention provides a lightweight portable cylindrical object retention apparatus with enhanced frictional engagement which allows one to easily load and transport cylindrical objects in a manner that minimizes movement of the cylindrical objects during transport.

The present invention is comprised of a series of elongate longitudinal tank support tubes connected together via flexible elongate connecting cables. The support tubes, in combination with the connecting cables, form multiple separate bays or cradles to receive, retain, restrain and support two cylindrical objects. As a cradle is loaded with a cylindrical object, e.g., a scuba tank or oxyacetylene tank, the connecting cables at either end flex and bow to conform to the curved profile of the cylindrical object. The cradles have lateral spans sufficient to snugly receive, capture and restrain the cylindrical object without allowing the cylindrical object to rest on the horizontal surface beneath the retention apparatus. This feature ensures that the entire weight of the cylindrical object is used to maximize functional engagement between the object, the apparatus and the underlying horizontal surface.

For simplicity and clarity throughout the remainder of this disclosure, the class of cylindrical objects will be referred to as "tanks." However, the present invention is intended to accommodate and be used for safely transporting both hollow cylindrical objects, e.g., tanks or pipe, as well as solid cylindrical objects.

The support tubes, connecting cables and resulting cradles of the retention apparatus are sized to prevent a tank loaded in a bay from actually resting on the horizontal surface below the tank support tubes. This causes the entire weight of a loaded tank to be supported by the adjacent tubes. Hence, the tank weight is used most efficiently to maximize the frictional engagement between the wall of a tank and the support tubes. This novel design also maximizes the frictional engagement between the tank support tubes and the horizontal surface upon which the tubes rest. Frictional engagement is further enhanced by the inclusion of a rubberized covering, with superior frictional characteristics, which is wrapped about the exterior mid-section of each longitudinal tank support tube.

Cylindrical tanks, including scuba tanks, oxyacetylene gas cylinders and the like, are known to be transported in vehicles while laid flat on a horizontal surface or bed of a vehicle without any form of appropriate restraint system. The vehicle bed may be the floor of the trunk of an automobile, the cargo section of a pick-up truck, the deck of a boat, or any other flat horizontal surface of any other vehicle which might be used to transport cylindrical tanks.

Once the tanks are laid on the bed or cargo deck of a vehicle or vessel, a person transporting the tanks will frequently use temporary means of restraining tank movement. Objects readily at hand, which are typically ill-suited for the purpose, may be wedged between the tanks to both limit their movement and act as a cushion between the tanks and/or the cargo area of the vehicle. Unfortunately, this approach does not adequately secure the tanks for transport. Where tanks are carried in the bed of a pickup, as opposed to the trunk of a car, the substantial volume of the pick-up cargo area may further complicate this free-form tank stowage and transport method. This is especially true on a boat deck.

Additionally, by simply laying tanks on the bed of a vehicle or on a boat deck, the frictional engagement between the tanks and the underlying horizontal surface is typically insufficient to prevent the tanks from sliding about during transport. Tank cylinders are typically made of steel or aluminum. Hence, the frictional engagement between the exterior of a tank and the surface of the bed of the vehicle or boat deck is usually very low. In addition, readily available objects used to wedge the tanks to prevent movement have a tendency to dislodge. Once dislodged, the cylindrical tanks are free to both roll and slide in the bed of the vehicle or boat deck during transit to the desired destination.

Unrestrained tank movement during transport can create a severe safety hazard. Typical tanks are sufficiently heavy, whether empty or full, that their unrestrained movement in the cargo area of the vehicle or boat may cause extensive damage to both the vehicle or boat and adjacent tanks. Unrestrained tanks have been known to break off their valve heads due to movement within the cargo area during transport. If the tank is full of pressurized gas, the result can be deadly. The high pressure gas will escape through the orifice created by the broken valve head. As a result, the tank can become a deadly projectile, propelled by the jet of pressurized gas.

As an alternative to the above haphazard stowage method, various types of rigid racks have been used to stow and secure cylindrical tanks for transport in vehicles or on boats. Permanent and quasi-portable rigid racks made of steel, aluminum or other sufficiently robust and rigid material have been used to positively mount cylindrical tanks within a vehicle. These rigid tank racks include structural frames which enclose and surround the tanks. Tank racks of this type may hold the tanks in either a vertical or horizontal orientation. Examples of these rack types include those taught by Gerhard (U.S. Pat. No. 4,060,174), Smith (U.S. Pat. No. 4,175,666) and Ziaylek (U.S. Pat. No. 4,391,377).

Rigid frame-type tank racks tend to be heavy, bulky and cumbersome. Further, these rigid tank racks sometimes require substantially permanent installation in the transport vehicle. Additionally, most "removable" tank racks of this type may still require partial installation of at least some component parts, such as mounting brackets.

Additionally, many rigid tank racks require that the tanks be stowed in a vertical upright position during transport. Examples of these rack types include those taught by Hadachek (U.S. Pat. No. 5,025,935), Rohatensky (U.S. Pat. No. 4,168,007) and Cummings (U.S. Pat. No. 5,299,721). In these racks, a tank's center of gravity is at a much higher elevation than when laid in a flat horizontal position. Consequently, as a vehicle or boat changes direction while transporting the tanks, e.g., by turning a corner, existing momentum of the tanks creates amplified tipping moment.

The amplified tipping moment may subject the vertically-orienting rack to substantially greater lateral forces than when the tanks are laid flat. Therefore, these types of tank racks must be constructed to resist the increased lateral forces generated during transport. Consequently, the size and weight of these racks naturally increases as thicker heavier members are used in the frame to accommodate the increased lateral forces.

Transporting tanks in an upright position may have other disadvantages. For example, the cargo area of the transport vehicle or boat must have sufficient headroom to accommodate the height of the tanks. Hence, the trunk of many cars might be too shallow to transport scuba tanks in an upright position. Likewise, the bed of a pickup with a cargo cover could preclude the use of a vertical rack system for oxyacetylene supply cylinders.

Lastly, rigid frame-type rack systems may have footprints that are larger than the footprints of the tanks themselves. Hence, valuable floor, deck or bed space is consumed by the rack which could have been used for storage of associated equipment.

Hence, rigid frame-type racks do not readily lend themselves to occasional use. A sports person would likely be disinclined to use a rigid frame-type rack. For this periodic need, rigid frame-type racks are extremely inconvenient and insufficiently portable.

As an alternative to the rigid tank racks discussed above, A-Plus Marine Supply, Inc. of Gulf Breeze, Fla., provides connected cylindrical foam pads to lay longitudinally adjacent a tank placed in a horizontal position on the bed of a vehicle. This foam pad system provides some cushioning, but fails to adequately restrain the tanks during transport. The surface of the foam pads is smooth and slippery; the pads do not effectively frictionally engage either the tanks themselves or the horizontal surface of the vehicle bed. Further, the foam pad system does not take advantage of the weight of the tanks to maximize frictional engagement between the tanks, the foam pads or the bed of the vehicle. Hence, the tanks may still easily slide linearly on the pads during vehicle acceleration or deceleration. In addition, the foam pads are readily deformable and present little rolling resistance to the tanks. Lateral tank momentum generated during transport may easily cause a tank to compress and roll over a foam pad.

Consequently, the foam pad system does not restrain tanks sufficiently to allow one to confidently transport the tanks without additional retention means. This system also does not provide for simple adjustment to accommodate tanks of varying diameters. Hence, range of use is limited to specific tank sizes.

Accordingly, a need exists for a simple, compact, lightweight, low-cost and portable cylindrical object retention apparatus that can be easily used to restrain cylindrical objects during transport while the cylindrical objects are laid in a prostrate position on the horizontal surface of a vehicle or boat. A correlative need exists for such a retention apparatus with superior frictional engagement attributes to minimize and resist stowed tank rotational and translational movement. A further need exists for such a retention apparatus where the structural configuration provides sufficient rolling resistance to further resist tank rotational movement.

SUMMARY OF THE INVENTION

The present invention is comprised of a series of parallel elongate tubes whose ends are connected in series via two flexible connecting cables to form a ladder-like configuration. The tubes, in combination with the connecting cables, form one bay or cradle between each pair of adjacent tubes to accommodate a tank for transport. The tanks are supported by and rest longitudinally between the tubes within cradles formed by the span of the connecting cables.

Each cylindrical support tube is wrapped with an enhanced friction material which increases the frictional engagement between tubes the tanks resting on the tubes. The enhanced friction material also increases the frictional engagement between the bottom surface of the support tube and the horizontal surface upon which it rests, e.g., the bed of a transport vehicle or the deck of a boat. The increased frictional engagement enhances the ability of the apparatus to resist lateral, translational and rotational movement of both the stowed tanks relative to the tubes and the entire retention apparatus during transport.

Additionally, the longitudinal tank support tubes have sufficient size to present adequate rolling resistance to the stowed tanks while still providing a small, lightweight and portable retention apparatus. The tubes, in combination with the connecting cables, form at least one cradle. The span of each cradle is sufficiently wide to receive and securely hold a tank during transport. The span of the cradle is less than the diameter of a stowed tank to allow the weight of each tank to rest directly and entirely on the tubes, rather than the underlying horizontal surface between the tubes.

By preventing a tank from touching the horizontal surface of the transport vehicle or boat deck, the entire weight of the tank is transmitted to the contact area between the bottom surface of the tubes and the horizontal surface of the vehicle or boat. Hence, frictional engagement between the tubes and the horizontal surface is maximized. Thus, the lateral force required to overcome this frictional resistance is also maximized. Additionally, the frictional engagement between the gripping portion of a tube and a tank resting on the tube is also maximized, reducing the potential for the tank to slide out of the tank bay. Consequently, a transport vehicle or boat may operate at higher speeds without causing movement of the tanks or the retention apparatus.

The two flexible connecting cables are typically routed through holes near the ends of each support tube. The ends of each cable are terminated inside the interior of the two outside support tubes of the apparatus so that the ends will not pull out when placed under load. Each cable also has a spacer or knot at its midpoint within the interior of tubes of the apparatus. These interior center knots allow the length of each cradle span to vary slightly according to the inside diameter of the center tubes to accommodate tanks of slightly different diameters.

To use the retention apparatus of the present invention, the tube and cable assembly is first laid flat and stretched out on the bed of the transport vehicle or boat deck. The vehicle bed or boat deck must be of sufficient size to accommodate the footprint of the tanks laid side by side in a horizontal position. Then, a first tank is laid lengthwise in a bay of the retention apparatus to rest on and between two of the longitudinal tank support tubes and the cradles formed by the connecting cables. The tank is positioned on the two longitudinal tubes such that the tubes are approximately centered in the middle of the length of the tank.

Additional tanks may then be laid and centered in other bays, next to the first tank. The tanks may be cinched between their adjacent support tubes by applying additional downward pressure on the tanks as they rest in their respective bays. If desired, a bungee cord or other retention strap may be connected to the exterior holes in the outermost tubes to wrap across and further restrain the tanks.

The tanks are easily removed by disengaging any retention strap, then lifting each tank off its cradle. Once unloaded, the retention apparatus may be simply rolled up for storage.

OBJECTS OF THE INVENTION

Accordingly, a primary object of the present invention is to provide a retention apparatus for cylindrical objects that can be used to safely and securely transport cylindrical objects or tanks, laid in a horizontal position on the bed of a transport vehicle or boat deck.

Another object of the present invention is to provide a cylindrical object retention apparatus that is effective yet compact, lightweight, portable and low cost.

Another object of the present invention is to provide a cylindrical object retention apparatus whose longitudinal tank support tubes are wrapped with an external covering that maximizes the frictional engagement between the bottom surfaces of the tubes and the horizontal surface upon which the tubes rest, thereby minimizing translational or lateral movement of the loaded retention apparatus during transport.

Another object of the present invention is to provide a cylindrical object retention apparatus whose longitudinal support tubes are wrapped with an external covering that maximizes the frictional engagement between the exterior walls of the cylindrical tanks stowed in the apparatus and that portion of the support tubes upon which the tanks rest, thereby minimizing translational, lateral or rotational movement of the tanks themselves.

Another object of the present invention is to provide a cylindrical object retention apparatus whose center longitudinal support tube has a width sufficient to adequately separate adjacent tanks to prevent the tanks from damaging each other during transport.

Another object of the present invention is to provide a cylindrical object retention apparatus whose configuration prevents the stowed tanks from touching or resting directly upon the horizontal surface or bed of the transport vehicle or boat deck, thereby transmitting the entire weight of the stowed tanks first to the interface between the tanks and the support tubes, then to the interface between the support tubes and the horizontal surface, thereby maximizing the frictional engagement between the tanks, the longitudinal support tubes and the horizontal surface to minimize tank and retention apparatus movement during transport.

Another object of the present invention is to provide a cylindrical object retention apparatus where the weight of adjacent tanks works synergistically to transmit a normal component of force through the center longitudinal tank support tube of the apparatus which is approximately twice the normal force transmitted through the outermost tubes, thereby amplifying frictional engagement between the bottom surface of the center longitudinal tank support tube and the horizontal surface of the transport vehicle or boat deck to resist lateral or translational movement of the loaded retention apparatus on the bed of the transport vehicle or boat deck during transport.

Another object of the present invention is to provide a cylindrical object retention apparatus whose component parts may be easily collapsed for storage when not in use.

Another object of the present invention is to provide a cylindrical object retention apparatus whose cradle spans may be easily adjusted to accommodate cylindrical tanks of various diameters.

Another object of the present invention is to provide a cylindrical object retention apparatus whose configuration naturally tends to capture a tank between adjacent support tubes.

Another object of the present invention is to provide a cylindrical object retention apparatus whose longitudinal tank support tubes are substantially rigid to prevent deformation of the tubes by the static weight or momentum of the stowed tanks during transport, thereby maximizing the rolling resistance presented to the stowed tanks to resist tank rotational or lateral movement during transport.

Another object of the present invention is to provide a cylindrical object retention apparatus whose areal footprint is minimized to reduce the horizontal surface area required in the vehicle or boat for the loaded retention apparatus.

Another object of the present invention is to provide a cylindrical object retention apparatus which can be used to accommodate cylindrical objects of varied lengths.

Another object of the present invention is to provide a cylindrical object retention apparatus whose basic elements may be easily replicated to accommodate stowage of one or a plurality of tanks.

Another object of the present invention is to provide a cylindrical object retention apparatus that may be used in tandem combination to accommodate cylindrical tanks of substantial length.

Another object of the present invention is to provide a cylindrical object retention apparatus of simple and reliable manufacture from commonly available materials.

Other further objects of the present invention will become apparent from a careful reading of the included drawing figures, the claims and detailed description of the invention.

BRIEF DESCRIPTION OF THE DRAWING FIGURES

Figure 4:
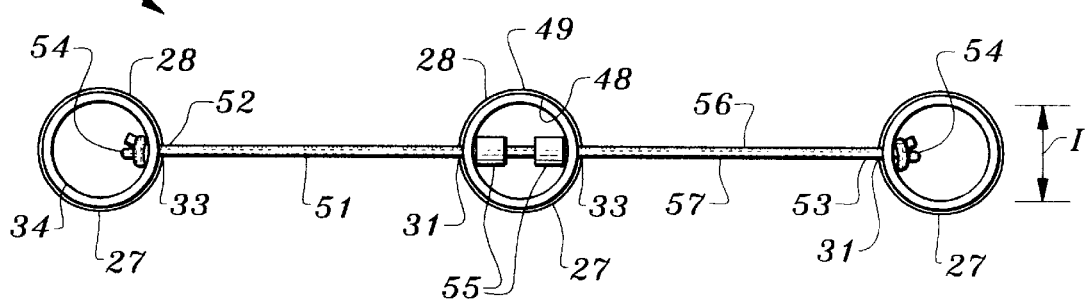

FIG. 4 is an end view of the present invention in its deployed state, depicting the configuration of the connecting cables as attached to the longitudinal tank support tubes and illustrating the termination of the connecting cables within the interior of the outermost tubes. This view also shows the spacer in the form of two rope stops on the connecting cable residing within the interior of the center longitudinal tank support tube.

Figure 5:
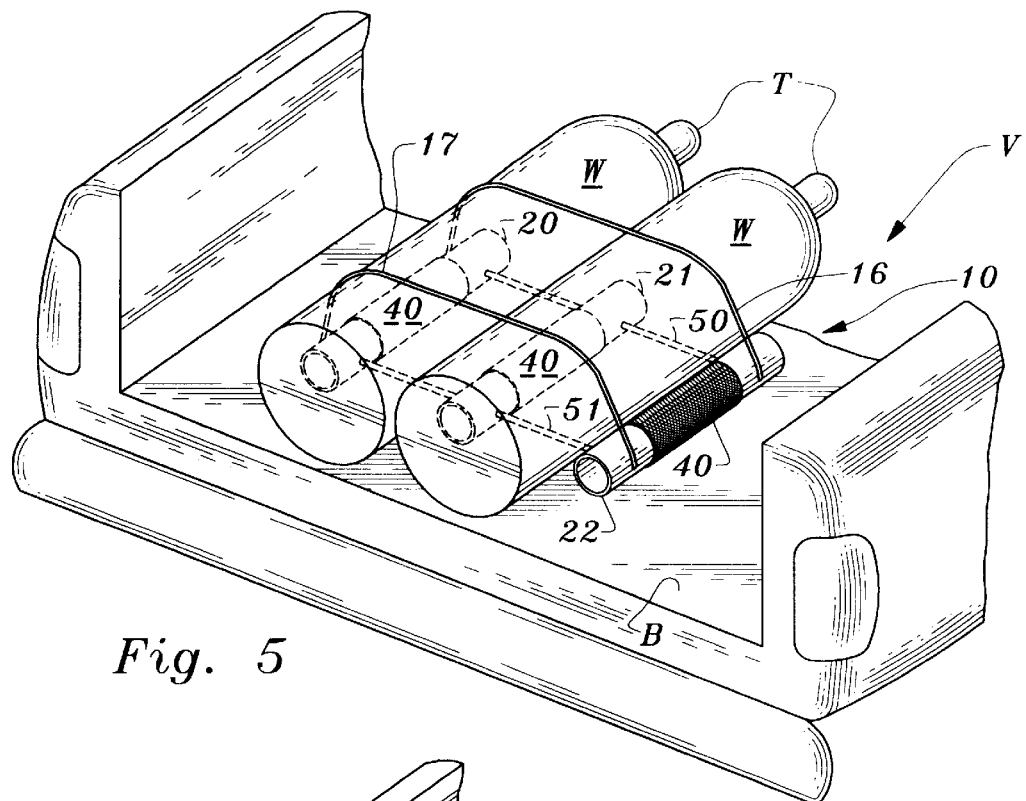

FIG. 5 is a perspective view of the present invention installed on the cargo bed of a typical pick-up truck with two tanks resting in the cradles of the apparatus relatively centered lengthwise above the longitudinal support tubes and with two elastic straps stretched over a top of the tanks.

Figure 6:
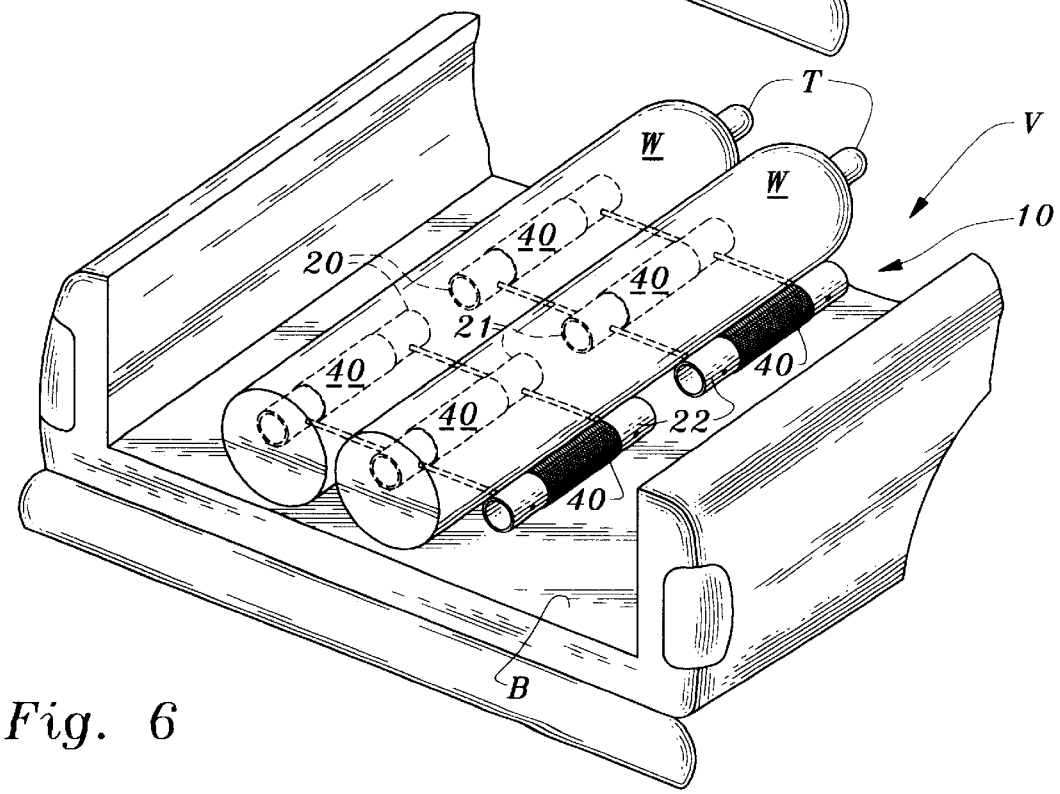

FIG. 6 is a perspective view of an alternative use of two units of the present invention used in tandem to accommodate tanks of greater length.

Figure 7:
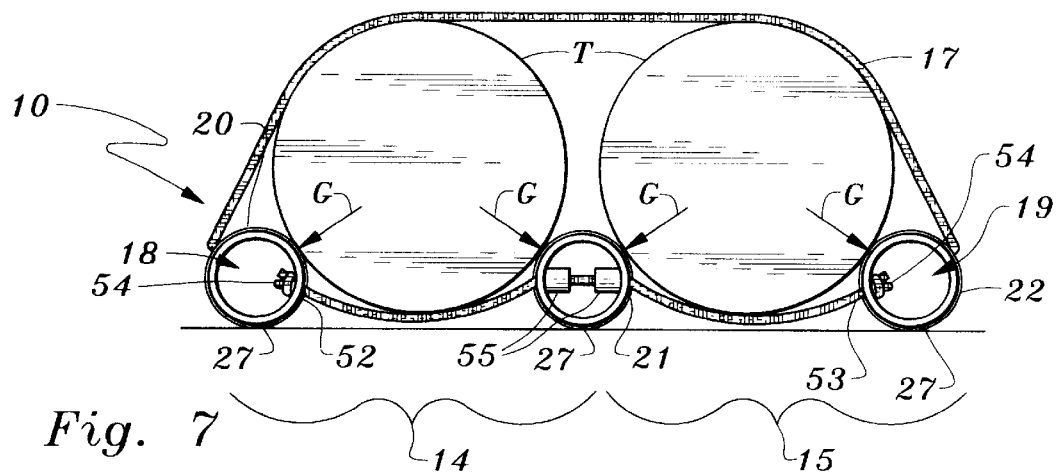

FIG. 7 is an end view of the present invention with two cylindrical tanks stowed within two cradles and depicting the typical correspondence between the diameter of the longitudinal tank support tubes and the span of the connecting cables and showing how elastic straps can pass over a top of the tanks.

Figure 8:
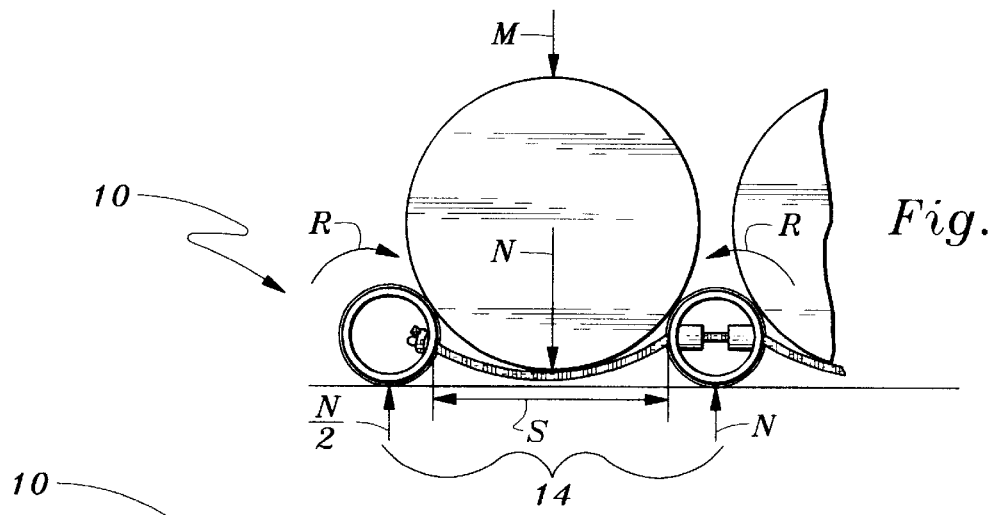

FIG. 8 is an end view of the left bay or cradle of the present invention, illustrating the manner in which a tank deflects the connecting cables of its cradle, causing the adjacent support tubes to roll inward to cinch the tank in its grasp.

Figure 9:
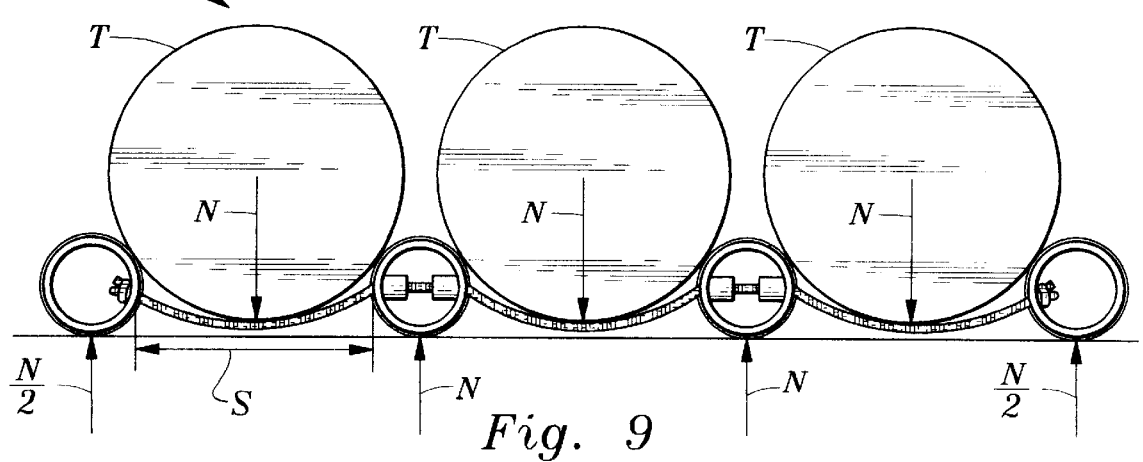

FIG. 9 is an end view of the present invention but depicting an alternative configuration with four longitudinal tank support tubes to create three bays or cradles to receive three tanks, illustrating how extra tubes can be added to the invention to expand the number of tanks supported.

DETAILED DESCRIPTION OF THE PREFERRED EMBODIMENT

Figure 1:
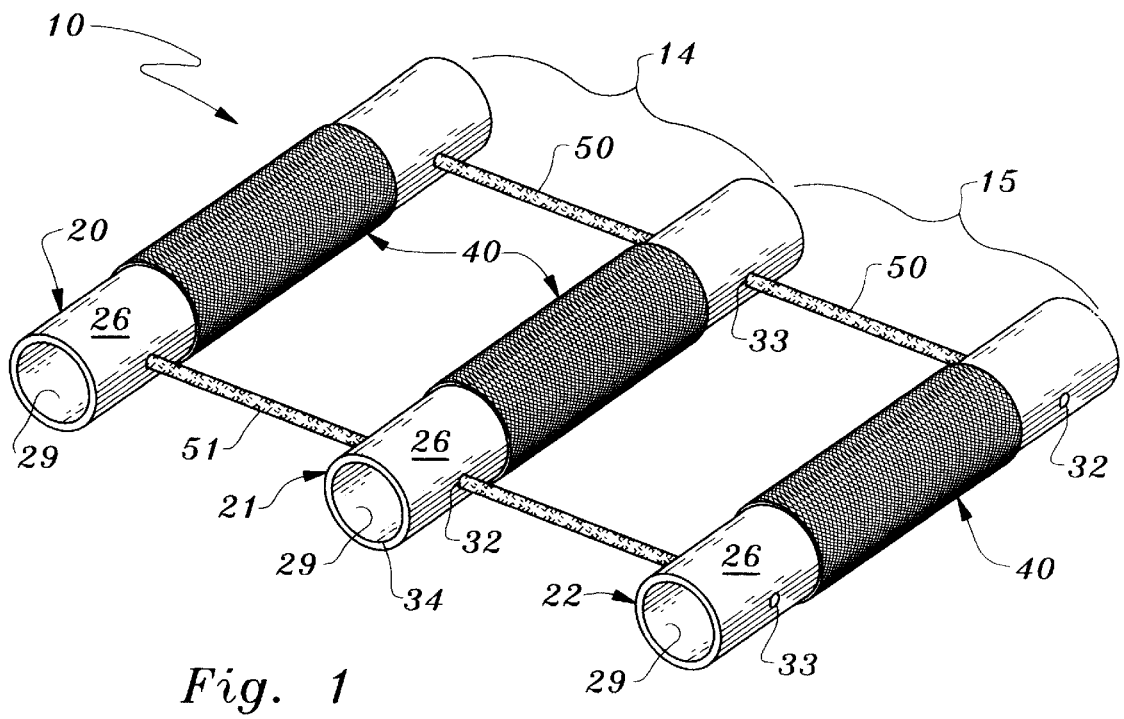
FIG. 1 is a perspective view showing the retention apparatus of the present invention as it would be deployed on the horizontal surface of a transport vehicle in preparation for placement of tanks within each cradle. The invention could similarly be deployed on deck of a boat.
Figure 2:
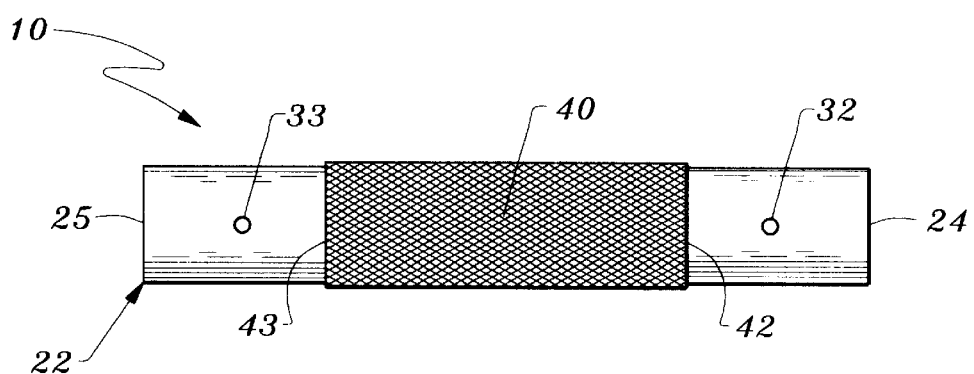
FIG. 2 is a side view of the present invention in its deployed state.
Figure 3:
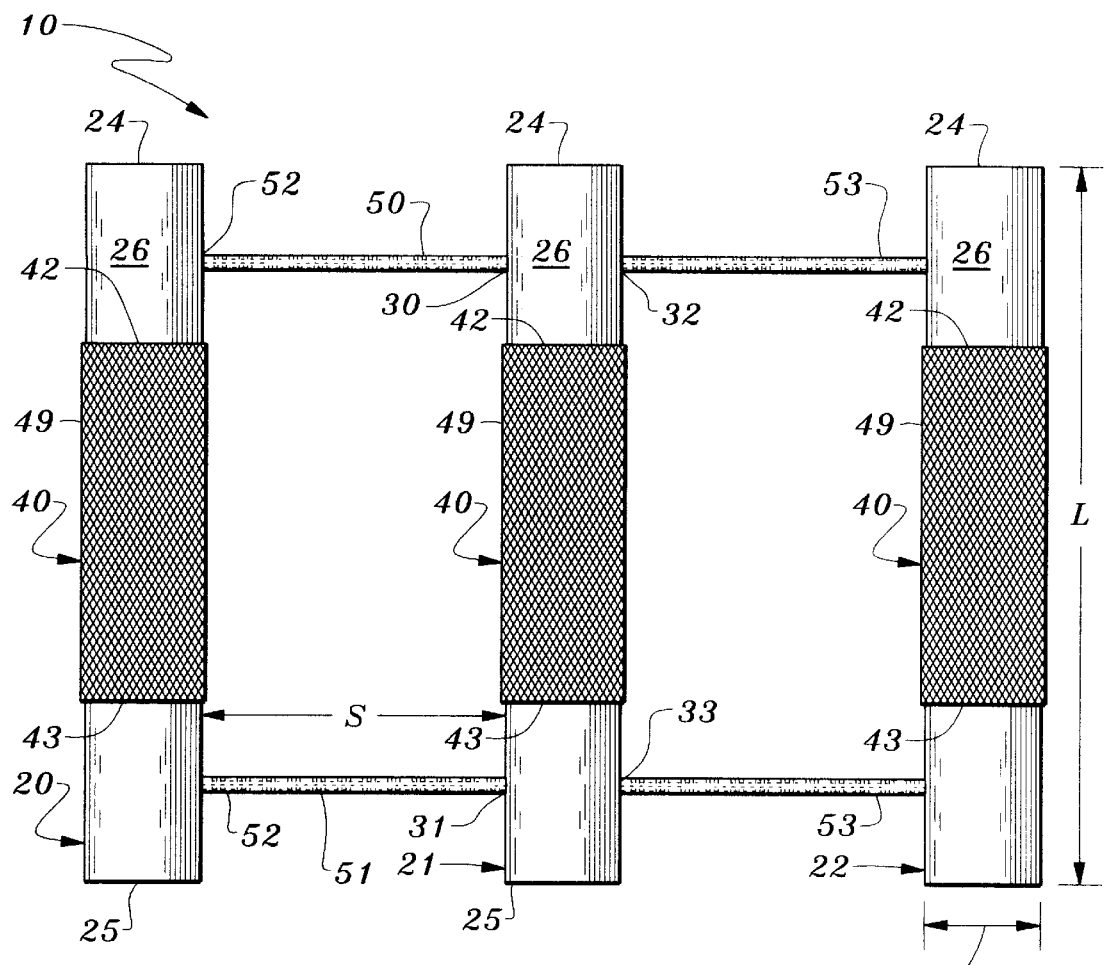
FIG. 3 is a top plan view of the present invention in its deployed state.

Referring to the drawings, wherein like reference numerals represent like parts throughout the various drawing figures, reference numeral 10 is directed to a preferred embodiment of a retention apparatus for cylindrical objects, such as tanks T. As shown in FIG. 1, the retention apparatus 10 is comprised of three elongate, substantially rigid, hollow cylindrical tank support tubes 20, 21, 22. The support tubes 20, 21, 22 are connected at their ends 24, 25 in series via two connecting cables 50, 51 to form two cylindrical object bays or cradles 14, 15. If a greater or lesser number of tanks T are to be supported, the number of tubes 20, 21, 22 will be modified to equal the number of tanks T plus one.

The apparatus 10 is engineered to fully utilize the weight of the stowed cylindrical objects, hereinafter referred to as tanks T, to maximize component frictional engagement. The simplicity and portability of the design of the retention apparatus 10 affords maximum convenience to a user while providing a secure means to support and restrain tanks T laid in a horizontal position on a bed or horizontal surface B of a vehicle V or boat deck to resist lateral, rotational and translational movement of the tanks T or the retention apparatus 10 during transport.

In essence, and with particular reference to FIG. 1, the basic details of the cylindrical object retention apparatus 10 are described. When two tanks T are to be carried, the apparatus 10 includes three substantially rigid elongate hollow cylindrical tank support tubes 20, 21, 22 connected via two flexible connecting cables 50, 51. When deployed, the central axes of the three support tubes 20, 21, 22 are substantially parallel and coplanar to form a ladder-like configuration. The support tubes 20, 21, 22 and connecting cables 50, 51 form left and right cradles or bays 14, 15 to receive the two individual tanks T. Each support tube 20, 21, 22 is wrapped about its midsection with a rubberized covering 40 which provides a means to enhance frictional engagement between associated contact surfaces of the apparatus 10, the stowed cylindrical tanks T and the bed B of the transport vehicle V.

More particularly, and with particular reference to FIGS. 1–4, details of the cylindrical object retention apparatus 10 are provided. When two tanks T are to be carried, the apparatus 10 includes three preferably identical elongate longitudinal tank support tubes 20, 21, 22. If more or fewer than two tanks T are to be supported, the tubes 20, 21, 22 are supplied in numbers equal to the number of tanks T plus one. Two outer elongate cylindrical tubes 20, 22, designated as the port and starboard tubes 20, 22, are uniformly disposed to flank the third center tube 21. The central axes of all three tubes 20, 21, 22 are substantially parallel and coplanar when the apparatus 10 is deployed on a flat horizontal surface B to receive tanks T for stowage.

The tubes 20, 21, 22 are preferably made of a lightweight, substantially rigid, impact resistant material, such as polyvinyl chloride ("PVC") or other similar thermoplastic resin. Alternative materials such as steel or aluminum may be used in place of plastic. To minimize manufacturing expense, the tubes 20, 21, 22 are preferably made from readily available cylindrical PVC pipe, such as that used for water piping in residential lawn sprinkler systems.

Since each tube 20, 21, 22 is preferably substantially structurally identical to the other two tubes 20, 21, 22 only the details of the port support tube 20 are described in detail here. Any functional differences between the tubes 20, 21, 22 are subsequently described.

The port support tube 20 has an exterior cylindrical surface 26 which extends from a first end 24 of the port tube 20 to a second end 25 of the port tube 20. The port tube 20 is hollow having an interior cylindrical surface 29 extending from the first end 24 to the second end 25. The interior cylindrical surface 29 is circumferentially parallel with the exterior cylindrical surface 26 of the port tube 20. The exterior cylindrical surface 26 and the interior cylindrical surface 29 in combination with the first end 24 and the second end 25 form a cylinder wall of the port tube 20. The thickness of the cylinder wall is defined by the radial distance between the interior cylindrical surface 29 and the exterior cylindrical surface 26.

Additionally, although shown as having circular cross-sections, the tubes 20, 21, 22 could also have multi-sided polygon cross-sectional shapes. Such shapes would enhance areas of surface contact between the tubes 20, 21, 22 and the tanks T or an underlying bed B. The tubes 20, 21, 22 could also be in the form of solid dividers rather than being tubular. The tubes 20, 21, 22 merely provide a preferred form for the dividers between the tanks T, and divider which can perform the functions of separating and supporting the tanks T could effectively be utilized.

The exterior cylindrical surface 26 of the port tube 20 is preferably tightly wrapped about its midsection with a bifacial external covering 40. The covering 40 preferably covers only a portion of the exterior cylindrical surface 26 of the port tube 20 but may cover the entire exterior surface 26 of the port tube 20. The covering 40 extends from a first transverse edge 42 near the first end 24 of the port tube 20 to a second transverse edge 43 near the second end 25 of the port tube 20.

The external covering 40 is preferably made of rubberized material with superior friction enhancing surface irregularities. One such material is commercially available from Leggett & Platt of St. Louis, Missouri and Vantage Industries of Atlanta, Georgia and is provided under the trademark "SCOOT-GARD." The covering 40 enhances frictional engagement between contact surfaces of the retention apparatus 10 and corresponding portions of the stowed tanks T and the bed B of a transport vehicle V. Although a rubberized surface is the preferred material for the covering 40 due to its ability to effectively frictionally engage a wall W of a metal tank T, other equivalent materials could be used to accommodate cylindrical objects other than metal tanks T, where the exterior surface of the cylindrical object would frictionally engage more effectively with a covering 40 of different material.

For example, the tubes 20, 21, 22 might be wrapped with a covering 40 of rubber, leather or fabric, to include various surface irregularities, including dimples, raised grids, embedded silica grit or other surface used to enhance frictional engagement.

The covering 40 has an outer surface 49 radially disposed furthest from the exterior cylindrical surface 26 of the port tube 20. The outer surface 49 includes surface irregularities which serve to increase frictional engagement between the various contact surfaces of the apparatus 10, the stowed tanks T and the underlying horizontal support surface such as the bed B of the transport vehicle V or boat deck.

The covering 40 has an opposing inner surface 48 which rests adjacent the exterior cylindrical surface 26 of the port tube 20. The inner surface 48 of the covering 40 includes surface irregularities similar to that of the outer surface 49. These surface irregularities enhance the frictional engagement of the covering 40 with the exterior cylindrical surface 26 of the port tube 20. If greater attachment of the covering 40 to the exterior cylindrical surface 26 of the port tube 20 is desired, appropriate adhesive may be used to somewhat permanently engage the inner surface 48 of the covering 40 with the exterior cylindrical surface 26 of the port tube 20.

The wall of the port tube 20 is penetrated near its first end 24 by two preferably circular and diametrically-opposed holes 30, 32. The diametrically-opposed holes 30, 32 are preferably located approximately midway between the first end 24 of the port tube 20 and the first edge 42 of the circumferential covering 40. The holes 30, 32 have a diameter preferably only slightly greater than the diameter of the forward elongate connecting cable 50. The forward connecting cable 50 passes through the right hole 32 of the first end 24 of the port tube 20. A port end 52 of the forward connecting cable 50 terminates within the interior of the port tube 20 using means, such as a knot 54 or a rope stop 55 in the form of a crimpable collar of material such as aluminum. The termination means is sufficient to prevent the cable 50 from pulling out of the hole 32 when subjected to the load of a tank T. The wall of the port tube 20 is also penetrated near its opposing second end 25 in a like manner as the first end 24 to receive the rear connecting cable 51 in its right rear hole 33. The rear connecting cable 51 is similarly terminated with a rope stop 55 or knot or other similar means to prevent release.

The center tube 21 and the starboard tube 22 are constructed in a manner substantially identical to the port tube 20 with like holes 30, 31, 32, 33 and external covering 40. The center tube 21 and the starboard tube 22 differ only in the manner in which they are connected to an adjacent tube 20, 21, 22 via the two connecting cables 50,51.

As shown in FIG. 4, once the connecting cables 50, 51 have been connected to the port tube 20, starboard ends 53 of the cables 50, 51 may be passed through the left holes 30, 31 of the center tube 21. Preferably, each cable 50, 51 is provided with two rope stops 55 attached to the rope inside the tube 21, but spaced from each other and the holes 30, 31 of the center tube 21. While the stops 55 are shown adjacent the holes 30, 31, the stops are preferably spaced slightly away from the holes 30, 31 so that the center tube 21 can slide slightly on the cables 50, 51 (i.e. a quarter inch to a half inch). This sliding motion allows the center tube 21 to be precisely positioned adjacent tanks T of different diameters, especially when only one tank T is being restrained.

Alternatively, the cable 50, 51 can be knotted at its midpoint, such that the knot will permanently reside within the interior of the center tube 21. This rope stop 55 or knot serves to limit the movement of the center tube 21 along the connecting cables 50, 51. Other spacer means may also be used. The rope stops 55 are in the form of a crimpable clamp which can be permanently affixed to the midpoint of the cable 50, 51 to restrain the movement of the center tube 21 along the cables 50, 51.

Once a rope stop 55 or other spacer means has been interposed on the midpoint of the cables 50, 51, the starboard ends 53 of the cables 50, 51 may then be passed through the right holes 32, 33 of the center tube 21, then subsequently passed through the left holes 30, 31 of the starboard tube 22. The starboard ends 53 of both cables 50, 51 may then be knotted or terminated by other appropriate means to form outer terminators 54 which reside within the interior of the starboard tube 22.

Thus connected, the tubes 20, 21, 22, in combination with the connecting cables 50, 51, form a ladder-like configuration when laid out flat on a horizontal surface. As configured, the central axis of each tube 20, 21, 22 is coplanar and substantially parallel to the central axes of the remaining two tubes 20, 21, 22.

Although shown as having only two connecting cables 50, 51 to connect the tubes 20, 21, 22, the apparatus 10 could include three or more connecting cables to address differing needs or applications.

Once the apparatus 10 is deployed, each tube 20, 21, 22 establishes a bottom bearing surface 27 which rests on the horizontal surface or bed B of a transport vehicle V or boat deck. A gripping portion 28 of each tube 20, 21, 22 rests against and frictionally engages the wall W of a tank T stowed between the tube 20, 21, 22 and its adjacent tube 20, 21, 22. The center tube 21 includes two gripping surfaces 28 which frictionally engage the wall W of both tanks T stowed in the apparatus 10.

In use and operation, the cylindrical object retention apparatus 10 is first deployed on the bed B of the transport vehicle V in the manner shown in FIGS. 1 and 5. The tanks T are then laid longitudinally in the bays 14, 15 between adjacent tubes 20, 21, 22 such that the tanks T are relatively centered lengthwise over the tubes 20, 21, 22, so as to balance the stowed tanks T.

As shown in FIG. 6, two or more retention apparatuses 10 may be used to accommodate tanks T of such length or weight that one retention apparatus 10 would not provide sufficient resistance to lateral, translational or rotational movement during transport. Further, as shown in FIG. 9, the individual components of the apparatus 10 may be replicated and added to the basic two bay apparatus to hold three or more tanks T.

During the process of laying a tank T within a cradle 14, 15 between adjacent tubes 20, 21, 22, the design of the apparatus 10 acts to cinch a tank T between adjacent tubes 20, 21, 22. For clarity, the process of placing a tank T in the left cradle 14 of the apparatus 10 is described.

As a tank T is laid in the left cradle 14, the wall W of the tank T will first rest on the tank bearing surfaces 28 of the port and center tubes 20, 21. As the tank T continues to descend between the port and center tubes 20, 21, the tubes 20, 21 move laterally in opposing directions to accommodate the increasing width of the tank T profile. Eventually, the tubes 20, 21 will cease to spread as a maximum span S (FIG. 9) of the connecting cables 50, 51 within the left cradle 14 is reached. The maximum span S is defined by that portion of either cable 50, 51 which extends from an outer termination 54 resting adjacent the interior cylindrical surface 29 of a right circular penetration or hole 32, 33 within the port tube 20 and a rope stop 55 or knot 54 resting adjacent the interior cylindrical surface 29 of a left circular penetration or hole 30, 31 within the center tube 21.

Once the tubes 20, 21 are spread to the maximum span S, the wall W of the tank T will also bear on upper support surfaces 56 (FIG. 4) of the connecting cables 50, 51. As the tanks T continue to descend between the port and center tubes 20, 21, the cables 50, 51 will be deflected downward toward the horizontal surface or bed B of the vehicle V. The cables 50, 51 will deflect until the entire weight of the tank T, whose downward force is shown as arrow N in FIGS. 8 and 9, has been placed and distributed on the port and center tubes 20, 21 and the connecting cables 50, 51.

The connecting cables 50, 51 are substantially inelastic, yet flexible, to allow the cables 50, 51 to conform to the circular profile of a tank T, while simultaneously preventing a tank T from spreading the tubes 20, 21 such that the wall W of the tank T touches the underlying horizontal surface B. The required cradle span for a particular tank diameter is somewhat dependent on the diameter of the tank support tubes for optimal performance.

The configuration of the cradles 14, 15 of the apparatus 10 are unique in their ability to cinch the stowed tanks T between the tank bearing surfaces 28 of the adjacent support tubes 20, 21. As the weight N of a tank T is gradually distributed to the cables 50, 51, the cables 50, 51 descend toward the underlying horizontal surface B causing the adjacent tubes 20, 21 to rotate slightly inward as shown by arrows R in FIG. 8. This inward rotation R causes the tank T to be drawn deeper into cradle 14 by the frictional engagement between the tank bearing surfaces 28 of the port and center tubes 20, 21 and the walls W of the tank T.

As an added advantage of the present invention, the apparatus 10 provides a means to further cinch the tank T within the cradle 14 by applying additional manual downward force, as shown by the arrow M in FIG. 8, on the tank T. This additional downward force M will further deflect the cables 50, 51 downward toward the underlying horizontal surface B to cause the adjacent support tubes 20, 21 to rotate inward an additional amount. By repeatedly applying downward manual pressure M on the tank T as it rests in the cradle 14, the tank T will drop lower within the cradle 14 toward the underlying horizontal surface B until the combination of the weight N of the tank T and the manual downward force M is unable to stretch the substantially inelastic cables 50, 51 further. Accordingly, the cables 50, 51 must have sufficient tensile strength to withstand the increased tension forces created during this cinching process. Additionally, the outer terminations 54 and rope stops 55 must be able to withstand the same increased tension to prevent detachment of the cables 50, 51 from either tube 20, 21.

The apparatus 10 also uses the weight N of the tanks T in a novel manner to maximize the frictional engagement between the bottom bearing surface 27 of the center tube 21 and the underlying horizontal surface B. By preventing the tanks T from resting in any manner on the underlying horizontal surface B, the apparatus 10 ensures that the entire weight N of the tanks T is transmitted to the area of the bottom surface of all three support tubes 20, 21, 22. Effective use of the entire weight N of the tanks T, in combination with the superior frictional coefficient of the external tubular covering 40, ensures that the static friction between the loaded apparatus 10 and the underlying horizontal surface B is maximized, thereby, maximizing the ability of the apparatus 10 to resist lateral and translational forces to which the loaded apparatus 10 may be subjected during transport.

Additionally, the design of the apparatus 10 acts to amplify the static friction between the bottom bearing surface 27 of the center support tube 21 by taking advantage of an appropriate twofold increase in forces normal to the underlying horizontal surface B created by the weight N of two adjacent tanks T in the cradles 14, 15. The center support tube 21 supports twice the load of either the port support tube 20 or the starboard support tube 22. Hence, the frictional engagement between the bottom surface 27 of the center support tube 21 and the underlying horizontal surface B is greatly amplified. This amplified frictional engagement further maximizes the ability of the loaded apparatus 10 to resist both lateral and translational forces to which the apparatus 10 may be subjected during transport.

It is preferred that the tanks T not touch each other and the tubes 20, 21, 22 are sized to minimize the possibility of tank T contact. When the tanks T hit each other undesirable noise is generated and tank T damage may occur. When three or more tanks T are stowed, another option is to force constant tank T contact by stacking one tank T directly over the center tube 21 and resting against two lower tanks T in the cradles 14, 15.

Two elastic straps 16, 17 can stretch between the port tube 20 and starboard tube 22 is hold the tanks T down on the tubes 20, 21, 22. The straps 16, 17 preferably have hooks at a port end 18 and a starboard end 19 which can hook into the penetrations in the port tube 20 and starboard tube 22 which do not have the cables 50, 51 passing therethrough and so are vacant. The straps 16, 17 are particularly advantageous when tanks T are stacked on top of each other as described above.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A portable apparatus for restraining cylindrical objects upon a support surface with a central axis of the cylindrical objects substantially parallel to the support surface, the apparatus comprising in combination:

at least two elongate dividers positionable laterally on opposite sides of at least one cylindrical object and adapted to be adjacent the cylindrical object;

at least two flexible connectors attached to and extending between said dividers;

said at least two dividers including a covering attached to surfaces thereof, said covering having greater friction than said surfaces of said at least two dividers;

said covering located on both an underside of said at least two dividers adjacent the support surface, and on a portion of said dividers adapted to be closest to the adjacent cylindrical object, such that when the cylindrical object abuts said dividers, said covering addresses the cylindrical object;

wherein said at least two elongate dividers are rigid;

wherein said covering circumscribes each of said dividers;

wherein said at least two flexible connectors are adapted to be shorter than a diameter of the cylindrical objects to be supported overlying the flexible connectors and adjacent said dividers;

wherein at least three elongate dividers are attached to said at least two flexible connectors, said at least three dividers including a center divider of elongate form extending substantially parallel between the other two of said at least three elongate dividers, each of said at least three dividers including said covering thereon; and wherein said central divider has a hollow interior with said flexible connectors passing through said hollow interior, and at least one rope stop affixed on each of said flexible connectors, said rope stop sufficiently large to be precluded from passing out of said interior, such that said central divider is prevented from unlimited sliding along said flexible connectors.

2. A portable apparatus for restraining cylindrical objects upon a support surface with a central axis of the cylindrical objects substantially parallel to the support surface, the apparatus comprising in combination:

at least two elongate dividers positionable laterally on opposite sides of at least one cylindrical object and adjacent the cylindrical object;

at least two flexible connectors attached to and extending between said dividers;

said at least two dividers including a covering attached to surfaces thereof, said covering having greater friction than said surfaces of said at least two dividers;

said covering located on both an underside of said at least two dividers adjacent the support surface, and on a portion of said dividers closest to the adjacent cylindrical object, such that when the cylindrical object abuts said dividers, said covering addresses he cylindrical object;

wherein said at least two elongate dividers are rigid;

wherein said covering circumscribes each of said dividers;

wherein said at least two flexible connectors are shorter than a diameter of the cylindrical objects to be supported overlying the flexible connectors and adjacent said dividers;

wherein said flexible connectors are circular in cross-section;

wherein each of said at least two dividers are circular and tubular in cross-section; and wherein said flexible connectors are configured as rope passing through holes in said dividers extending into an interior of said dividers with a knot provided at ends of the rope forming said flexible connectors such that said flexible connectors remain attached to said at least two dividers.

* * * * *